United States Patent [19]
Harris

[11] Patent Number: 5,638,975
[45] Date of Patent: Jun. 17, 1997

[54] LOST MOTION FUEL CAP WITH CAP CLOSURE INDICATOR

[75] Inventor: Robert S. Harris, Connersville, Ind.

[73] Assignee: Stant Manufacturing Inc., Connersville, Ind.

[21] Appl. No.: 239,314

[22] Filed: May 6, 1994

[51] Int. Cl.6 .................................................. B65D 41/04
[52] U.S. Cl. .................. 220/288; 220/303; 220/DIG. 33; 116/200; 116/309
[58] Field of Search .................................... 215/230, 330; 220/300, 303, 304, 288, DIG. 33; 116/200, 223, 309–311, 315, 318

[56] References Cited

U.S. PATENT DOCUMENTS

| 2,006,752 | 7/1935 | Swank. |
| 2,043,054 | 6/1936 | Marty et al.. |
| 2,591,562 | 4/1952 | Levell. |
| 2,792,964 | 5/1957 | Reese et al.. |
| 2,865,531 | 12/1958 | Gorst et al.. |
| 2,964,214 | 12/1960 | Stannard. |
| 2,990,971 | 7/1961 | Enell. |
| 3,082,905 | 3/1963 | Friend. |
| 3,098,636 | 7/1963 | Contella. |
| 3,111,239 | 11/1963 | Ivins. |
| 3,112,840 | 12/1963 | Miller et al.. |
| 3,147,881 | 9/1964 | Friend. |
| 3,163,315 | 12/1964 | Wilson. |
| 3,186,580 | 6/1965 | Previte. |
| 3,203,445 | 8/1965 | McCormick. |
| 3,373,894 | 3/1968 | Johnson. |
| 3,404,657 | 10/1968 | Zmuda. |
| 3,434,621 | 3/1969 | Previte. |
| 3,587,912 | 6/1971 | Nagoya et al.. |
| 3,616,960 | 11/1971 | Miller et al.. |
| 3,703,245 | 11/1972 | Brewer. |
| 3,854,911 | 12/1974 | Walker. |
| 3,903,837 | 9/1975 | Barton et al.. |
| 4,000,633 | 1/1977 | Evans. |
| 4,036,399 | 7/1977 | Gerdes. |
| 4,083,209 | 4/1978 | Sloan, Jr.. |
| 4,091,955 | 5/1978 | Sloan, Sr.. |
| 4,102,472 | 7/1978 | Sloan, Jr.. |
| 4,107,961 | 8/1978 | Evans. |
| 4,177,931 | 12/1979 | Evans. |
| 4,228,915 | 10/1980 | Hooper et al.. |
| 4,245,751 | 1/1981 | Neiman. |
| 4,271,976 | 6/1981 | Detwiller. |
| 4,280,346 | 7/1981 | Evans. |
| 4,280,347 | 7/1981 | Evans. |
| 4,337,873 | 7/1982 | Johnson. |
| 4,342,208 | 8/1982 | Evans. |
| 4,436,219 | 3/1984 | Reutter. |
| 4,458,823 | 7/1984 | Baker. |
| 4,458,824 | 7/1984 | Baker et al.. |
| 4,494,673 | 1/1985 | Hiraishi. |
| 4,498,493 | 2/1985 | Harris. |
| 4,572,396 | 2/1986 | Kasugai et al.. |
| 4,579,244 | 4/1986 | Fukuta. |

(List continued on next page.)

FOREIGN PATENT DOCUMENTS

| 2161374 | 6/1973 | Germany. |
| 2206583 | 8/1973 | Germany. |

Primary Examiner—Allan N. Shoap
Assistant Examiner—Nathan Newhouse
Attorney, Agent, or Firm—Barnes & Thornburg

[57] ABSTRACT

A cap is provided for use in the filler neck of a tank. The cap includes a closure mechanism for closing the filler neck and a handle mechanism for rotating the closure mechanism relative to the filler neck to a sealed position engaging the filler neck and establishing a sealed connection between the closure mechanism and the filler neck. The cap also includes a delayed actuation mechanism for providing a lost-motion driving connection between the handle mechanism and the closure mechanism and an indicator mechanism for providing an indication of sealed closure of the filler neck upon movement of the closure mechanism in the filler neck to its sealed position. The indicator mechanism includes an indicator affixed to the delayed actuation mechanism and the indicator is a reflective member visible to a user of the fuel cap.

45 Claims, 5 Drawing Sheets

U.S. PATENT DOCUMENTS

| | | |
|---|---|---|
| 4,588,102 | 5/1986 | Kasugai . |
| 4,666,056 | 5/1987 | Kasugai et al. . |
| 4,676,390 | 6/1987 | Harris . |
| 4,678,097 | 7/1987 | Crute . |
| 4,726,488 | 2/1988 | Kasugai . |
| 4,765,505 | 8/1988 | Harris . |
| 4,795,053 | 1/1989 | Kasugai et al. . |
| 4,854,471 | 8/1989 | Kasugai et al. . |
| 4,913,303 | 4/1990 | Harris . |
| 5,108,001 | 4/1992 | Harris ........................ 220/DIG. 33 |
| 5,110,003 | 5/1992 | MacWilliams . |
| 5,184,739 | 2/1993 | Kusz ........................ 215/230 X |
| 5,449,086 | 9/1995 | Harris ........................ 220/DIG. 33 |

LOST MOTION FUEL CAP WITH CAP CLOSURE INDICATOR

BACKGROUND AND SUMMARY OF THE INVENTION

The present invention relates filler neck closure caps, and particularly to caps for closing filler necks of vehicle fuel tanks. More particularly, the present invention relates to a filler neck cap that provides a lost-motion driving connection between a handle and a closure member to delay actuation of the closure member in a cap-removal direction during cap removal and provides a visual indication that the fuel cap has been advanced to the fully closed position, sealing the vehicle fuel tank during cap installation.

Conventional fuel caps for closing threaded filler necks of vehicle fuel tanks generally include an outer handle or shell that is coupled for rotation to a closure member or housing and a sealing ring for establishing a seal between the cap and the filler neck. The housing is normally formed to include threads that are configured to engage corresponding threads formed on the filler neck.

It is known to provide a torque override driving connection between the handle and the housing to prevent over-tightening of the housing within the filler neck and to prevent possible scuffing or other damage to the filler neck sealing ring in the cap during installation of the cap on the filler neck. For example, U.S. Pat. No. 4,280,346 to Evans shows a torque override cap. It is also known to provide either a direct driving connection or delayed actuation driving connection between the handle and the housing. For example, U.S. Pat. No. 4,765,505 to Harris shows a delayed actuation driving connection fuel cap.

In addition, it is known to provide a visual indication that the cap has been advanced to the fully closed position for caps without mechanisms for lost-motion connections or torque override driving connections. For example, U.S. Pat. No. 4,436,219 to Reutter shows a sealing cap that displays a visual indicator when the sealing cap is fully closed.

It is perceived, however, that some users occasionally do not properly install their fuel cap in a vehicle fuel tank filler neck, resulting in excessive evaporative emissions. One solution to this problem would be to simplify the installation method, such as with an easy-on one-quarter turn fuel cap. Another solution is to provide a fuel cap with a delayed actuation driving connection that includes a visual indication that the fuel cap has been advanced to the fully closed position. This visual indication can also be accompanied by an audible click and a noticeable change of feel when the handle is turned after the fuel cap has been advanced to the fully closed position. What is needed is a lost-motion filler neck cap having a mechanism that is operable to provide a user with tactile and visual signals that the cap has been properly installed in a sealed filler neck-closing position and is compatible with a torque override system in the cap for preventing damage to a filler neck sealing ring during installation of the cap in the filler neck.

According to the present invention, a cap is provided for use in a filler neck. The cap includes a closure or housing for closing the filler neck, a handle for rotating the closure relative to the filler neck, a delayed action device for providing a lost-motion driving connection between the handle and closure, a torque override device for preventing damage to the filler neck sealing ring due to overtightening of the housing during installation of the cap on the filler neck, and an indicator for signalling that the fuel cap has been advanced to the fully closed position.

In preferred embodiments, the torque override system provides a direct connection between the handle and the closure in the counterclockwise cap-removal direction and a torque override driving connection in the clockwise cap-advancing direction. The system includes a ring positioned between the handle and the closure and resilient annular fingers on the closure that terminate in pawl teeth. The side of the ring adjacent to the closure includes spaced-apart teeth. The faces of the pawl teeth and the spaced-apart teeth are configured to provide a direct connection in the cap-removal direction and a torque override connection in the cap-advancing direction.

The ring is also integral to the lost-motion driving connection. This feature disables the connection between the handle and the closure when the handle is rotated from the fully closed position to the cap-removal position, thus maintaining the seal between the cap and the filler neck when the handle is unintentionally rotated in the cap-removal direction. The lost-motion driving connection mechanism includes drive lugs that are coupled to the handle and driven lugs that are attached to the ring. The drive lugs engage the driven lugs to transmit rotation from the handle to the closure. The spacings of the drive lugs and the driven lugs result in the lost-motion driving connection and establish the amount of lost-motion achieved.

The ring and the handle rotate independently except for when the cap is in the cap-removal orientation and the handle is being rotated in the cap-removal direction, and when the filler neck is sealed and the torque override system is engaged. A visual indication that the filler neck is sealed is provided by placing an indicator dot on the ring and including an indicator window in the handle so that the indicator dot is visible through the indicator window when the filler neck is sealed and the torque override system is engaged.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
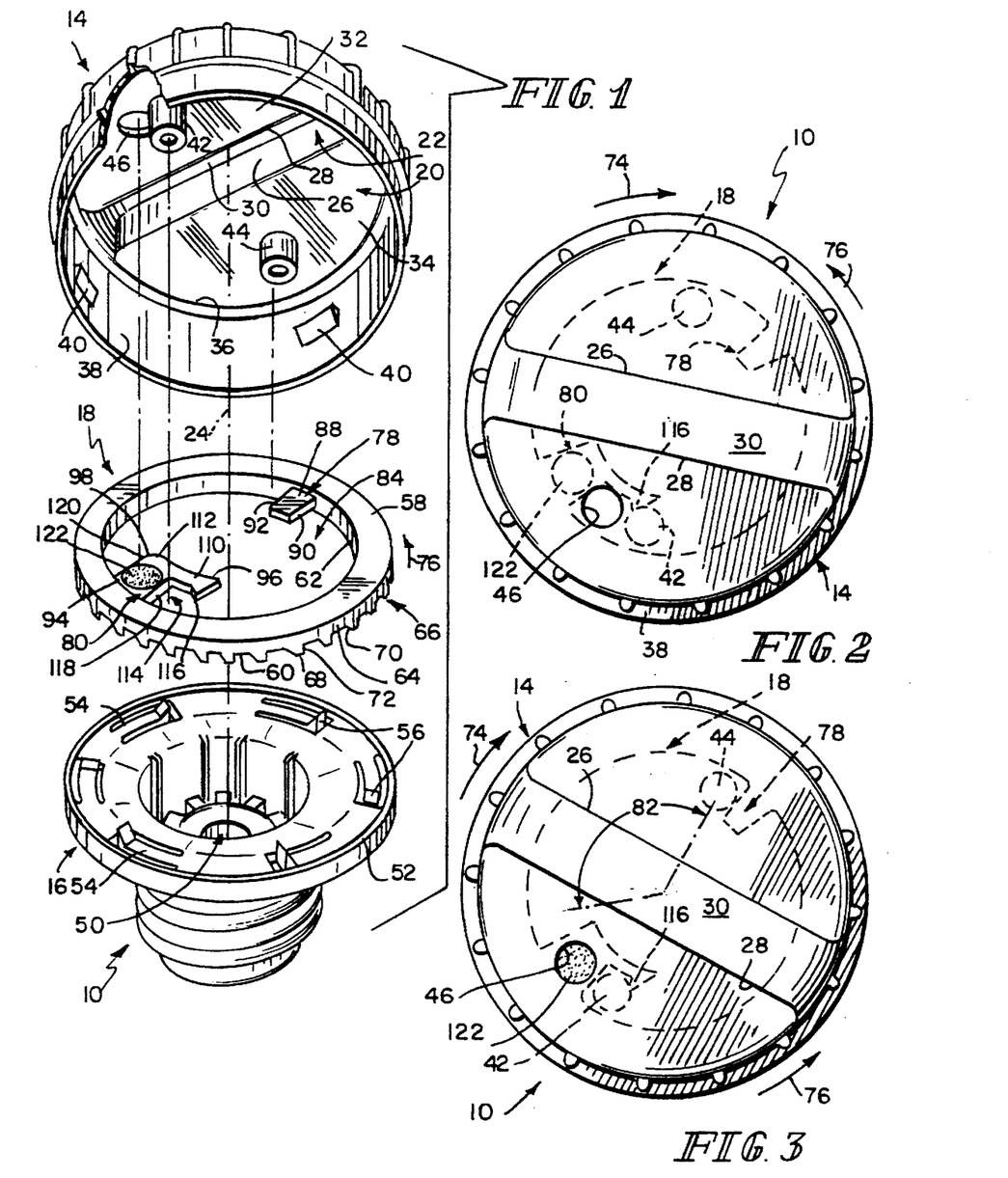
FIG. 1 is an exploded perspective view of a first embodiment of a fuel cap in accordance with the present invention showing a threaded housing for closing an open filler neck, an annular torque transmission ring including a straight driven lug and an L-shaped driven lug with an indicator dot affixed to the L-shaped driven lug, and a hollow handle including an indicator window and a pair of integral, downwardly extending drive lugs arranged to engage the driven lugs and establish a lost-motion driving connection between the handle and the annular torque transmission ring and housing.
FIG. 2 is a plan view of the fuel cap in FIG. 1 showing the handle and the annular torque transmission ring (in phantom) as one of the two drive lugs engages the anti-drift retaining lug to transmit torque from the handle to the housing as the handle is rotated in a clockwise cap-advancing direction and before the indicator dot is visible in the indicator window.
FIG. 3 is a view similar to FIG. 2 showing one of the drive lugs snapped into engagement with the L-shaped driven lug to expose the indicator dot and signal to a user that the cap is properly installed in a sealed filler neck-closing position.

The components of a first embodiment of a fuel cap 10 for closing a filler neck (not shown) are illustrated in FIGS. 1–3. A second embodiment of a cap is shown in FIGS. 4–8 and a third embodiment of the cap is shown in FIGS. 9–13. Each of these caps includes a torque override mechanism and apparatus for providing an operator with tactile and visual signals that the cap has been installed properly in a sealed filler neck-closing position.

Referring now to FIG. 1, fuel cap 10 includes a shell or handle 14 used to rotate a closure or housing 16 to close the filler neck. An annular torque transmission ring 18 is situated in between the shell 14 and housing 16 to transmit rotation from the shell 14 to the housing 16 during installation on or removal from the filler neck.

The shell 14 includes a top wall 20 with a handle grip 22 formed in the top wall 20. The handle grip 22 is used to impart rotational torque to the cap 10 about an axis of rotation 24. The handle grip 22 includes upstanding side walls 26, 28 arranged to lie parallel to each other and to extend upward from the top wall 20 away from the housing 16. The upstanding side walls 26, 28 include a top edge to which an upper wall 30 is appended. The handle grip 22 bisects the top wall 20 to create semicircular portions 32, 34. Semicircular portion 32 includes an indicator window 46.

The top wall includes a perimeter edge 36. A cylindrical side wall 38 is appended to the perimeter edge 36 and extends downward toward the housing 16. Six retaining lugs 40 are appended to the cylindrical side wall 38. The retaining lugs 40 couple the housing 16, annular torque transmission ring 18, and shell 14 together.

Drive pins 42, 44 are integrally appended to the top wall 20 and extend downwardly from the top wall 20 along an axis parallel to the axis of rotation 24. Each drive pin 42, 44 lies in its own semicircular portion 32, 34 so that drive pin 42 is situated in semicircular portion 32 and drive pin 44 is situated in semicircular portion 34. The length of the drive pins 42, 44 is selected so that the drive pins 42, 44 transmit rotation to the annular torque transmission ring 18. The drive pins 42, 44 are cylindrical in shape and are hollow. In alternative embodiments, the drive pins 42, 44 may be of a different length and shape and may be appended to the shell 14 in a different location or manner.

The closure or housing 16 is configured to engage a threaded filler neck in a conventional manner to provide a fluid-tight seal when the housing 16 is fully engaged into the filler neck. It will be understood that any other suitable alternative filler neck connection mechanism can also be used.

A pressure-vacuum valve assembly 50 is shown for illustrative purposes only in its conventional position disposed in the housing 16. The pressure-vacuum valve assembly 50 controls the venting of fuel vapor from the fuel tank when the pressure within the tank reaches a predetermined, superatmospheric level. The pressure-vacuum valve assembly 50 also controls the venting of air into the fuel tank when the pressure in the tank decreases to a predetermined subatmospheric level. The pressure-vacuum valve assembly 50 is a conventional unit and well known to those skilled in the art. It will be understood that any suitable valve could be used.

In addition, it will be understood that the novel features of the present invention are unrelated to the function of the pressure-vacuum valve assembly 50. Therefore, the inclusion of the assembly 50 is shown for illustrative purposes only. The cap 10 of the present invention will function regardless of the inclusion or omission of a pressure-vacuum valve assembly similar to the assembly 50.

The housing 16 includes a radially outwardly extending flange 52 at an axially upper portion of the housing 16. Six peripherally and slightly axially upwardly extending resilient fingers 54 are attached to the flange 52, as shown in FIG. 1. Each of the resilient fingers 54 terminates in a pawl tooth 56.

The annular torque transmission ring 18 includes an annular top wall 58, an annular bottom wall 60, a cylindrical inner edge 62, and a cylindrical outer edge 64. The annular torque transmission ring 18 is situated between the shell 14 and the housing 16 and is bounded by the cylindrical side wall 38 of the shell 14, as shown in FIG. 2. The annular top wall 58 faces the top wall 20 of the shell 14. The annular bottom wall 60 includes pockets 66 that are formed between spaced-apart teeth 68, as shown in FIG. 1. Each tooth includes an angled face 70 and an upright face 72. The annular bottom wall 60 cooperates with the resilient fingers 54. Specifically, the angled faces 70 of the spaced-apart teeth 68 engage the pawl teeth 56 to provide a torque overriding connection of the annular torque transmission ring 18 to the housing 16 in a clockwise cap-advancing direction 74 to permit advancement of the housing 16 into the filler neck. The torque overriding connection prevents overtightening the housing 16 in the filler neck which could otherwise lead to scuffing or damage to an annular sealing ring (not shown) mounted on housing 16.

In addition, the upright faces 72 of the spaced-apart teeth 68 engage the pawl teeth 56 to provide a direct connection of the annular torque transmission ring 18 to the housing 16 in a counterclockwise cap-removal direction 76 to permit removal of the housing 16 from the filler neck. The cooperation of resilient fingers 54 and the annular torque transmission ring 18 to provide the torque overriding connection in one direction and the direct connection in the other direction is well known in the art, and is specifically described in U.S. Pat. No. 4,280,346 to Evans, the entire disclosure of which is hereby incorporated by reference.

The cylindrical outer edge 64 lies adjacent to the cylindrical side wall 38 of the shell 14. The cylindrical inner edge 62 is concentric to the cylindrical outer edge 64. Driven lugs 78, 80 are appended to the cylindrical inner edge 62. The drive pins 42, 44 extend downward from the top wall 20 into a region 84 bounded by the cylindrical inner edge 62 and engage the driven lugs 78, 80 to transmit rotation from the shell 14 to the housing 16.

The drive pins 42, 44 and driven lugs 78, 80 also cooperate to provide a delayed actuation driving connection. In the illustrated embodiment, the driven lugs 78, 80 are spaced apart 180° to provide approximately 160° of lost motion 82 that the drive pins 42, 44 must travel through once they disengage a first driven lug 78 in a first direction and before they engage a second driven lug 80 in a second direction. In alternative embodiments, the driven lugs 78, 80 may be spaced apart at any predetermined angular dimension to provide a desired lost-motion distance 82.

In the illustrated embodiment, the first driven lug 78 is straight and the second driven lug 80 is L-shaped. Straight driven lug 78 extends radially inward toward the axis of rotation 24 a predetermined distance from a proximal end 88 appended to the cylindrical inner edge 62. The straight driven lug 78 includes side walls which extend radially inward toward the axis of rotation 24 from the proximal end 88 of the straight driven lug 78. The side walls include a cap-removal side 90 and a cap-advancing side 92. The straight driven lug 78 is used to engage the drive pins 42, 44 to transmit rotation from the shell 14 to the housing 16. The cap-advancing side 92 engages the drive pin 44 in a cap-advancing direction 74 and the cap-removal side 90 engages the drive pin 42 in a cap-removal direction 76.

The L-shaped driven lug 80 has a proximal end 94 appended to the cylindrical inner edge 62 and a distal end 96. The L-shaped driven lug 80 includes a first member 98 which extends from the proximal end 94 radially inward toward the axis of rotation 24 a predetermined distance and a second member 110 which extends from a distal end 112 of the first member 98 circumferentially to the distal end 96 of the L-shaped driven lug 80. The L-shaped driven lug 80 is used to engage the drive pins 42, 44 to transmit rotation from the shell 14 to the housing 16, and to create a pocket 114 for holding the drive pin 42 during rotation in the cap-advancing direction 74. An anti-drift retaining lug 116 is appended to the distal end 96 of the L-shaped driven lug 80 and extends radially outward from the axis of rotation 24 to create a drive pin-retaining pocket 114 for releasably retaining drive pin 42. The drive pin-retaining pocket 114 holds drive pin 42 stationary when the cap 10 is in its closed position. This ensures that the cap 10 will not lose the 160° of lost motion 82 when the cap 10 is in the closed position during any impact to or vibration of the cap 10.

An indicator dot 122 is affixed to the top of the L-shaped driven lug 80 as shown best in FIG. 1. As shown in FIG. 3, the indicator dot 122 is located so that when the cap 10 is in its closed position and the drive pin retaining pocket 114 holds drive pin 42 stationary, the indicator dot 122 is visible through the indicator window 46, providing a visual indication that the cap 10 is closed.

The L-shaped driven lug 80 includes a retaining side 118 and a non-retaining side 120. The retaining side 118 is shaped to define the drive pin-retaining pocket 114. When the cap 10 is rotated in a cap-removal direction 76, drive pin 42 engages the cap-removal side 90 of the straight driven lug 78 and drive pin 44 engages the non-retaining side 120 of the L-shaped driven lug 80. When the cap 10 is rotated in a cap-advancing direction 74, drive pin 42 engages the retaining side 118 of the L-shaped driven lug 80 and drive pin 44 engages the cap-advancing side 92 of the straight driven lug 80, exposing the indicator dot 122 through the indicator window 46.

In alternative embodiments, any number of drive pins 42, 44 or driven lugs 78, 80 may be used. In alternative embodiments, the driven lugs 78, 80 may include any combination of straight driven lugs 78 and L-shaped driven lugs 80.

Assuming that the cap 10 is removed from the filler neck and an operator (not shown) desires to insert the cap 10 into the filler neck, the shell 14 is rotated in the cap-advancing direction 74 (clockwise) through the lost-motion dimension 82 until the drive pin 42 engages the anti-drift retaining lug 116 of the L-shaped driven lug 80. This cap-advancing orientation is shown in FIG. 2.

This cap-advancing rotational movement acts to engage the housing 16 in the filler neck and rotatably advance the housing 16 to seal the filler neck. The rotational movement of the shell 14, the annular torque transmission ring 18, and the housing 16 in a cap-advancing direction 74 is continued until the housing 16 is fully engaged in the filler neck. Further rotation of the shell 14 in the cap-advancing direction 74 results in the advancement of the drive pins 42, 44. Drive pin 42 advances past the anti-drift retaining lug 116 and is releasably retained by the drive pin-retaining packet 114. Drive pin 44 advances until it abuts the straight driven lug 78. In this position, shown in FIG. 3, the indicator dot 122 is visible through the indicator window 46. Still further rotation of the shell 14 in the cap-advancing direction 74 results in the annular torque transmission ring 18 rotating with respect to the housing 16 due to the torque overriding connection between the annular torque transmission ring 18 and the housing 16 as described previously to prevent overtightening of the housing 16.

Because the drive pin 42 is releasably retained within the drive pin-retaining pocket 114, the shell 14 is prevented from any drifting rotational movement in the cap-removal direction 76 (counterclockwise). This is advantageous because any drifting rotational movement of the shell 14 in the cap-removal direction would reduce the predetermined amount of lost-motion movement available between the shell 14 and the annular torque transmission ring 18. Thus, because the drive pin 42 is releasably retained within the drive pin-retaining pocket 114, the maximum amount of predetermined lost motion in the cap-removal direction 76 is maintained when the cap 10 is properly installed in the filler neck.

To remove the cap 10 from the filler neck, the operator begins rotating the shell 14 in the counterclockwise cap-removal direction 76. Initial rotation of the shell 14 in the cap-removal direction 76 forces the drive pin 42 out of the drive pin-retaining pocket 114 without imparting any rotational movement to the annular torque transmission ring 18 or the housing 16, covering up the indicator dot 122. As illustrated in FIG. 3, the shell 14 is rotated approximately 160° before the drive pin 42 engages the cap-removal side 90 of the straight driven lug 78 and the drive pin 44 engages the non-retaining side 120 of the L-shaped driven lug 80. Continued rotation of the shell 14 in the cap-removal direction 76 will impart direct rotational movement to the housing 16 to begin removing the housing 16 from the filler neck.

Another embodiment of a fuel cap 210 for closing a filler neck (not shown) of a vehicle or other fuel system is illustrated in FIGS. 4–8. A delayed actuation device within the cap 210 permits a predetermined amount of lost motion 211 to be established between a shell or handle 212 and a closure or housing 214. Fuel cap 210 includes a shell or handle 212 used to rotate a closure or housing 214. A drive hub 216 is situated between the shell 212 and housing 214, and an annular torque transmission ring 218 is situated between the drive hub 216 and the housing 214. The drive hub 216 and annular torque transmission ring 218 transmit rotation from the shell 212 to the housing 214 during installation on or removal from the filler neck.

Figures 4, 9:
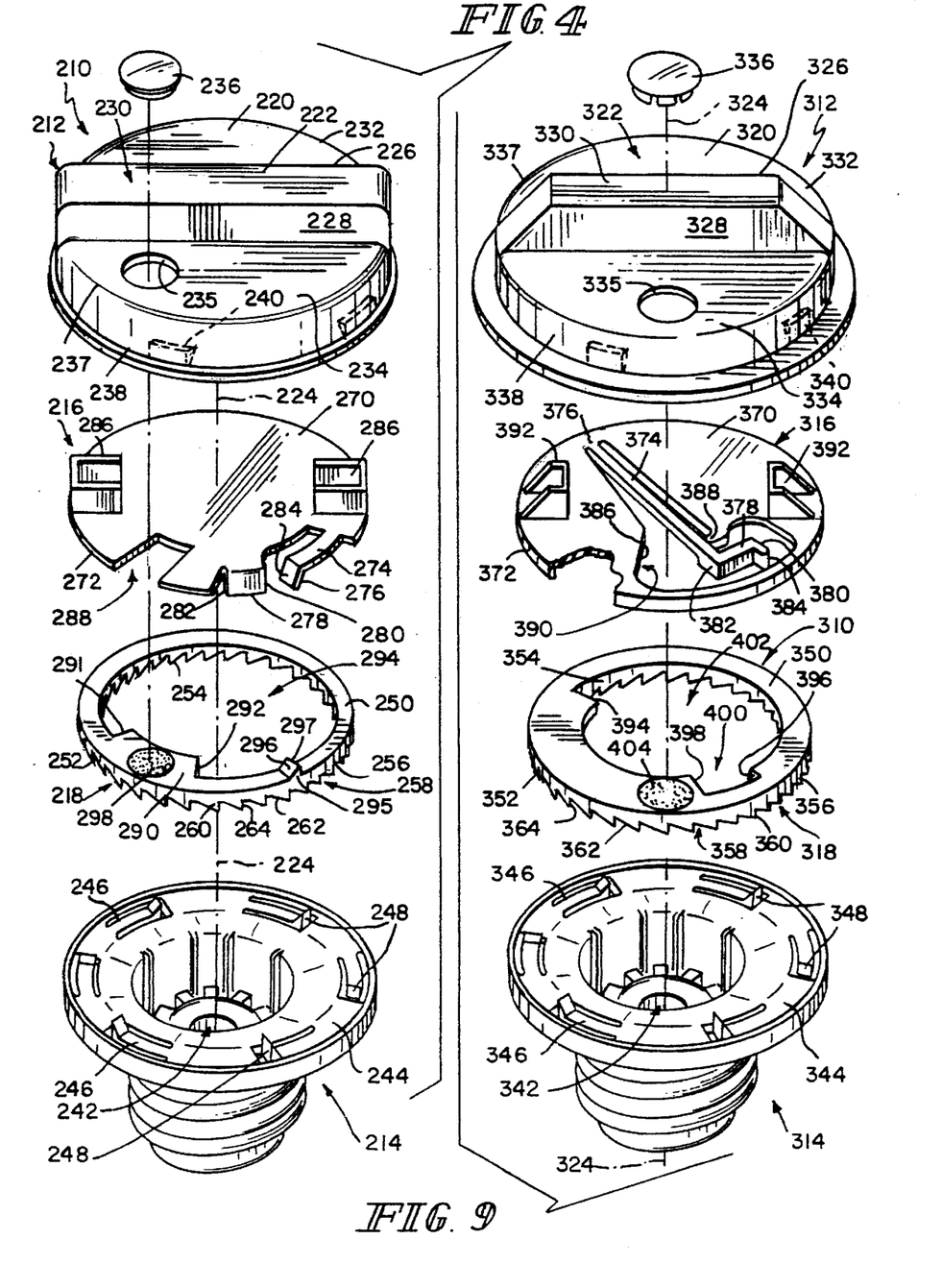
FIG. 4 is an exploded perspective view of a second embodiment of a fuel cap in accordance with the present invention showing a threaded housing for closing an open filler neck, an annular torque transmission ring including an anti-drift lug and a driven lug carrying an indicator dot, a drive hub including an annular latch arm, a drive lug, and an indicator cutout, a hollow handle including an indicator window, and a lens.
FIG. 9 is an exploded perspective view of a third embodiment of a fuel cap in accordance with the present invention showing a threaded housing for closing an open filler neck, an annular ring including an annular ring top wall and an indicator dot affixed to the annular ring top wall, a drive hub including an L-shaped resilient arm and an indicator cutout, a hollow handle including an indicator window, and a lens.

The shell 212 includes a top wall 220 with a handle grip 222 formed in the top wall 220. The handle grip 222 is used to impart rotational torque to the cap 210 about an axis of rotation 224. The handle grip 222 includes upstanding side walls 226, 228 arranged to lie parallel to each other and to extend upward from the top wall 220 away from the housing 214. The upstanding side walls 226, 228 include a top edge to which an upper wall 230 is appended. The handle grip 222 bisects the top wall 220 to create semicircular portions 232, 234. Semicircular portion 234 includes an indicator window 235. A lens 236 is included in the indicator window 235.

The top wall includes a perimeter edge 237. A cylindrical side wall 238 is appended to the perimeter edge 237 and extends downward toward the housing 214. Retaining lugs 240 are appended to the interior of cylindrical side wall 238. Retaining lugs 240 couple the housing 214, the annular torque transmission ring 218, the drive hub 216, and the shell 212 together.

A closure member or housing 214 is provided that is configured to threadingly engage a threaded filler neck in a conventional manner to provide a fluid-tight seal when the housing 214 is fully engaged into the filler neck. It will be understood that any other suitable alternative filler neck connection mechanism can also be used.

A pressure-vacuum valve assembly 242 is shown for illustrative purposes only in its conventional position disposed in the housing 214. The pressure-vacuum valve assembly 242 controls the venting of fuel vapor from the fuel tank when the pressure within the tank reaches a predetermined superatmospheric level. The pressure-vacuum valve assembly 242 also controls the venting of air into the fuel tank when the pressure in the tank decreases to a predetermined subatmospheric level. The pressure-vacuum valve assembly 242 is a conventional unit and well known by those skilled in the art. It will be understood that any suitable valve could be used.

In addition, it will be understood that the novel features of the present invention are unrelated to the function of the pressure-vacuum valve assembly 242. Therefore, the inclusion of the assembly 242 is shown for illustrative purposes only. The cap 210 of the present invention will function regardless of the inclusion or omission of a pressure-vacuum valve assembly similar to the assembly 242.

The housing 214 includes a radially outwardly extending flange 244 at an axially upper portion of the housing 214. Six peripherally and slightly axially upwardly extending resilient fingers 246 are attached to the flange 244. Each of the resilient fingers 246 terminates in a pawl tooth 248.

Figures 5, 6, 7, 8:
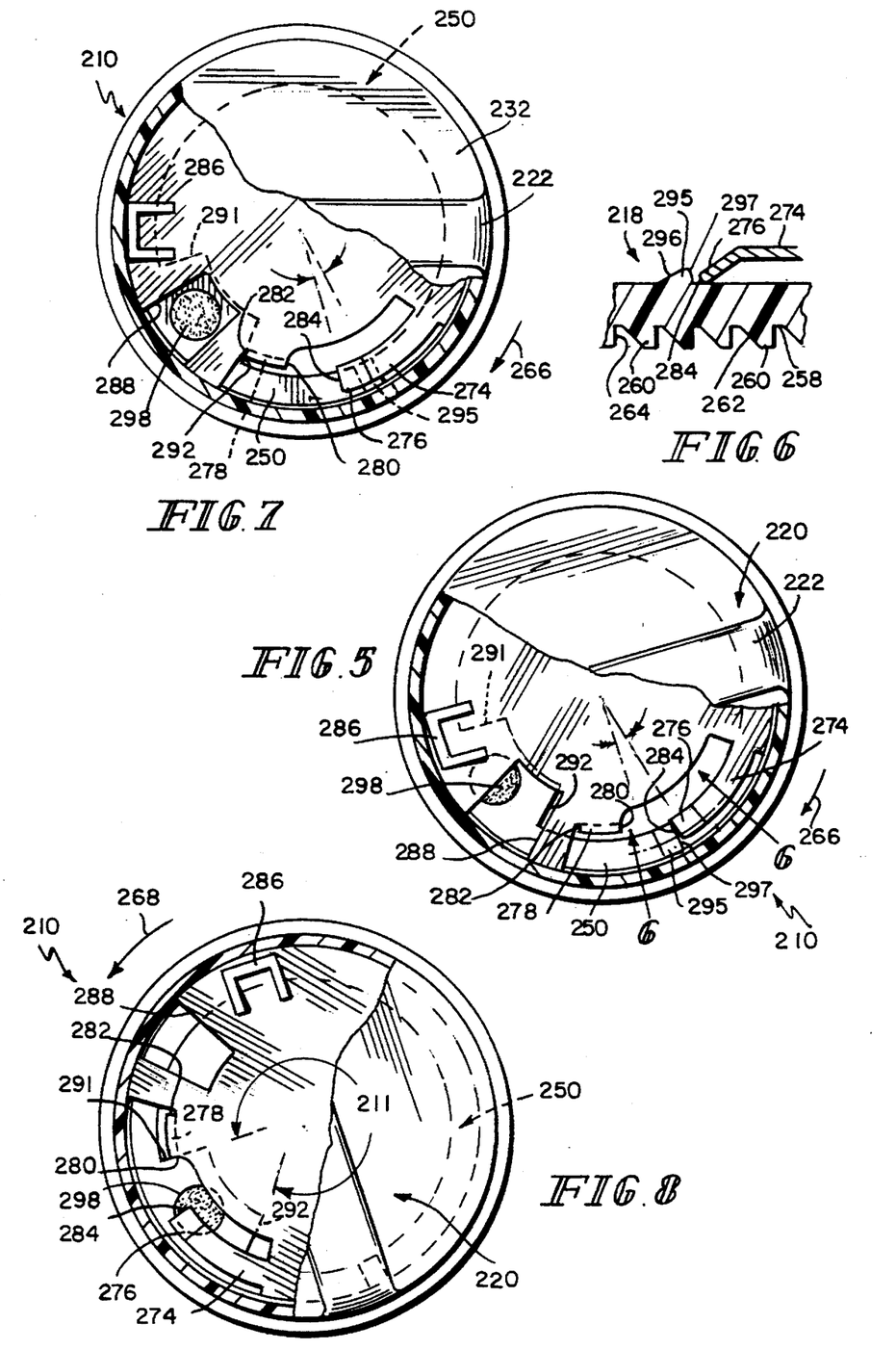
FIG. 5 is a plan view of the fuel cap in FIG. 4, with portions broken away, showing the relative position of the handle, the drive hub, and the annular torque transmission ring after the annular latch arm has moved to engage the anti-drift lug to begin to rotate the housing in a clockwise cap-advancing direction.
FIG. 6 is a sectional view taken along line 6—6 of FIG. 5 showing the annular latch arm engaging a driven lug on the annular torque transmission ring to rotate the housing in a clockwise cap-advancing direction.
FIG. 7 is a view similar to FIG. 5 showing the relative position of the handle, the drive hub, and the annular torque transmission ring after the annular latch arm has advanced past the driven lug to expose the indicator dot and signal to a user that the cap is properly installed in a sealed filler neck-closing position.
FIG. 8 is a view similar to FIGS. 5 and 7, showing the relative positions of the handle, the drive hub, and the annular torque transmission ring with the drive lug on the drive hub engaging the driven lug of the annular torque transmission ring in the cap-removal orientation.

The annular torque transmission ring 218 includes an annular top wall 250, an annular bottom wall 252, a cylindrical inner edge 254, and a cylindrical outer edge 256. The annular torque transmission ring 218 is situated between the drive hub 216 and the housing 214 and is bounded by the cylindrical side wall 238 of the shell 212, as shown in FIGS. 5, 7, and 8. The annular top wall 250 faces the drive hub 216. The annular bottom wall 252 includes pockets 258 that are formed between spaced-apart teeth 260, shown best in FIG. 6. Each tooth includes an angled face 262 and an upright face 264. The annular bottom wall 252 cooperates with the resilient fingers 246. Specifically, the angled faces 262 of the spaced-apart teeth 260 engage the pawl teeth 248 to provide a torque overriding connection of the annular torque transmission ring 218 to the housing in a cap-advancing direction 266 to permit advancement of the housing 214 into the filler neck. The torque overriding connection prevents overtightening the housing 214 in the filler neck.

In addition, the upright faces 264 of the spaced-apart teeth 260 engage the pawl teeth 248 to provide a direct connection of the annular torque transmission ring 218 to the housing 214 in a cap-removal direction 268 to permit removal of the housing 214 from the filler neck.

A drive hub 216 is situated between the shell 212 and the annular torque transmission ring 218 as shown in FIG. 4 to permit establishment of a driving connection between the shell 212 and the annular torque transmission ring 218. The drive hub 216 includes a drive hub top wall 270 which includes a drive hub perimeter edge 272 and a circumferentially extending latch arm 274 that terminates in a latch lug 276. The drive hub top wall 270 also includes an indicator cutout 288. A drive lug 278 is appended to the drive hub perimeter edge 272 and extends downward toward the housing 214. The drive lug 278 includes a first drive face 280 and a torque override drive face 282. The latch lug 276 includes a second drive face 284.

In addition, the drive hub top wall 270 includes two drive couplings 286 that extend inward from the drive hub perimeter edge 272 and upward toward the shell 212 to provide shell engagement means. Each one of the drive couplings 286 is configured to engage the corresponding upstanding side walls 226, 228 of the shell 212. The drive couplings 286 act to impart direct rotational movement of the shell 212 to the drive hub 216 in response to rotation of shell 212.

The cylindrical outer edge 256 of the annular torque transmission ring 218 lies adjacent to the cylindrical side wall 237 of the shell 212. The cylindrical inner edge 254 is concentric to the cylindrical 5 outer edge 256. Driven lug 290 is appended to the cylindrical inner edge and includes a first driven face 291 and a third driven face 292. The drive lug 278 extends downward from the drive hub perimeter edge 272 into a region 294 bounded by the cylindrical inner edge 254 and engages the driven lug 290 to transmit rotation from the shell 212 to the annular torque transmission ring 218.

The drive lug 278 and the driven lug 290 also cooperate to provide a delayed actuation driving connection. When the filler neck is closed, as shown in FIG. 7, the torque override drive face 284 abuts the third driven face 292. In the illustrated embodiment, the first drive face 280 and the torque override drive face 282 of the drive lug 278 are spaced apart approximately 10° and the driven faces 291, 292 of the driven lug 290 are spaced apart approximately 290° to provide approximately 280° of lost motion 211. This lost motion 211 is the distance that the drive lug 278 must travel once the torque override drive face 282 disengages the third driven face 292 and before the first drive face 280 engages the first driven face 291 in a cap-removal direction 268 (counterclockwise in FIG. 8). Thus, the spacings between the first drive face 280 and the torque override drive face 282 and the first driven face 291 and the third driven face 292 provide a predetermined lost-motion dimension 211 between the drive hub 210 and the annular torque transmission ring 218, and consequently between the drive hub 210 and the housing 214. Because the shell 212 is rigidly connected to the drive hub 210, these spacings provide the same predetermined amount of lost motion 211 between the shell 212 and the housing 214.

In alternative embodiments, the driven faces 291, 292 and the drive faces 280, 282 may be spaced apart at any predetermined annular dimension to provide a desired lost-motion distance.

The annular top wall 250 of the annular torque transmission ring 216 further includes an anti-drift driven lug 295. An anti-drift face 296 is disposed at the extreme clockwise end of the anti-drift driven lug 295 and a second driven face 297 is disposed at the extreme counterclockwise end of anti-drift driven lug 295. The latch lug 276 on the drive hub 216 is sized and configured to be releasably retained by the anti-drift face 296. The anti-drift face 296, the third driven face 292, the torque override drive face 282, and the latch lug 276 are spaced apart such that when the shell 212 is rotated in a cap-advancing direction 266 and the torque override drive face 282 engages the third driven face 292, the latch lug 276 will be retained by the anti-drift face 296. The latch lug 276 and the anti-drift face 296 cooperate when the drive hub 216 is in this position to prevent any drifting rotational movement of the drive hub 216 about axis 224 with respect to the annular torque transmission ring 218. This feature will be discussed below in the description relating to FIGS. 5–8.

An indicator dot 298 is affixed to the top of the driven lug 290. The indicator dot 298 is located so that when the cap 210 is in its closed position shown in FIG. 7 and the anti-drift face 296 retains the latch lug 276, the indicator dot 298 is visible through the lens 236, the indicator window 235, and the indicator cutout 288, providing a visual indication that the cap 210 is positioned in a sealed filler neck-closing position.

The operation of the annular torque transmission ring 218 to impart rotational movement to the housing 214 in response to rotation of the drive hub 216 is illustrated in FIGS. 5–8. As noted above, drive hub 216 is keyed to rotate with shell 212 due to engagement of drive couplings 286 on drive hub 216 and upstanding side walls 226, 228 on shell 212. A cap-advancing orientation of drive hub 216 is illustrated in FIGS. 5 and 6. The orientation of drive hub 216 of a fuel cap 210 that is properly installed in the filler neck of a fuel tank is illustrated in FIG. 7, while a cap-removal orientation of drive hub 216 is illustrated in FIG. 8. FIGS. 7 and 8 demonstrate the "lost-motion" capability of delayed actuation fuel cap 210. Specifically, FIGS. 7 and 8 show the relationship between the first drive face 280 and the first driven face 291, the torque override drive face 282, and the third driven face 292 to provide the predetermined amount of lost motion 211 between the shell 212 and the closure 214.

When the drive hub 216 is in the position shown in FIG. 8, the first drive face 280 is abutting the first driven face 291. In this orientation, the drive hub 216 is positioned to impart direct rotational movement to the annular torque transmission ring 218, and consequently to the housing 214, in the cap-removal direction 268 to remove the cap 210 from the filler neck.

Assuming that the cap 210 is removed from the filler neck and the operator (not shown) desires to insert the cap 210 into the filler neck, the shell 212 is rotated in the cap-advancing direction 266 which rotates the drive hub 216 until the second drive face 284 abuts the second driven face 297. This cap-advancing orientation is shown in FIGS. 5 and 6.

Once the second drive face 284 is abutting the second driven face 297, further rotational movement of the drive hub 216 in the cap-advancing direction imparts direct rotational movement to the annular torque transmission ring 218, and consequently to the housing 214. This rotational movement acts to engage the housing 214 in the filler neck. The direct rotational movement of the drive hub 216, the annular torque transmission ring 218, and the housing 214 in the cap-advancing direction is continued until the housing 214 is fully engaged in the filler neck.

Further rotation of the shell 212 and drive hub 216 in the cap-advancing direction requires that the operator provide additional torque resulting in a noticeable change of feel to the operator as the shell 212 is rotated. This further rotation results in the latch lug 276 advancing past the anti-drift driven lug 295 until the torque override drive face 282 engages the third driven face 292 shown in FIG. 7. When the torque override drive face 282 engages the third driven face 292, the indicator dot 298 is visible through the lens 236, the indicator window 235, and the indicator cutout 288, providing a visual indication that the cap 210 is closed. Still further rotation of the shell 212 and the drive hub 216 in the cap-advancing direction 266 results in the annular torque transmission ring 218 rotating with respect to the closure 214 due to the torque overriding connection between the annular torque transmission ring 218 and the housing 214 as described previously to prevent overtightening of the housing 214.

Because the latch lug 276 is resiliently received by the anti-drift face 296, the shell 212 and drive hub 216 are prevented from any drifting rotational movement in the cap-removal direction 268. This is advantageous because any drifting rotational movement of the drive hub 216 in the cap-removal direction 268 would reduce the predetermined amount of lost-motion movement 211 available between the drive hub 216 and the annular torque transmission ring 218. Thus, because the latch lug 276 is resiliently received by the anti-drift face 296, the maximum amount of predetermined lost motion 211 in the cap-removal direction 268 is maintained when the cap 210 is properly installed in the filler neck.

To remove the cap 210 from the filler neck, the operator begins rotating the shell 212 in the cap-removal direction 268. Initial rotation of the shell 212 and drive hub 216 in the cap-removal direction 268 forces the latch lug 276 past the anti-drift driven lug 295 without imparting any rotational movement to the annular torque transmission ring 218 or housing 214. Continued rotational movement of the drive hub 216 in the cap-removal direction 268 moves the first drive face 280 toward the first driven face 291. The drive hub 216 is rotated for approximately 280° before the first drive face 280 abuts the first driven face 291. Thus, in the illustrated embodiment, the predetermined amount of lost motion 211 between the drive hub 216 and the annular torque transmission ring 218 in the cap-removal direction 268 is approximately 280°. Once the first drive face 280 abuts the first driven face 291, as shown in FIG. 8, continued rotation of the drive hub 216 in the cap-removal direction 268 will impart direct rotational movement to the housing 214 to begin removing the housing 214 from the filler neck.

By providing the approximately 280° of lost motion 211 between rotation of the shell 212 with respect to the housing 214 in the cap-removal direction 268, the crashworthiness of the cap 210 is improved. When the cap 210 is properly installed in the filler neck, the drive hub 216 will be in the position illustrated by FIG. 7. Should the vehicle (not shown) be involved in an accident which results in a portion of the vehicle body interacting with the shell 212 to impart rotational movement on the shell 212 in the cap-removal direction 268, the shell 212 would have to rotate a full 280° before the housing 214 begins to disengage from the filler neck. Thus, unless the shell 212 is rotated a full 280°, the housing 214 remains in full sealing contact with the filler neck.

A third embodiment of a fuel cap 310 for closing a filler neck (not shown) of a vehicle or other fuel system is illustrated in FIGS. 9–13. Fuel cap 310 includes a shell or handle 312 used to rotate a closure or housing 314 to close the filler neck. A drive hub 316 is situated between the shell 312 and housing 314, and an annular torque transmission ring 318 is situated between the drive hub 316 and the housing 314. The drive hub 316 and the annular torque transmission ring 318 transmit rotation from the shell 312 to the housing 314.

The shell 312 includes a top wall 320 with a handle grip 322 formed in the top wall 320. The handle grip 322 is used to impart rotational torque to the cap 310 about an axis of rotation 324. The handle grip 322 includes upstanding side walls 326, 328 arranged to lie parallel to each other and to extend upward from the top wall 320 away from the housing 314. The upstanding side walls 326, 328 include a top edge to which an upper wall 330 is appended. The handle grip 322 bisects the top wall 320 to create semicircular portions 332, 334. Semicircular portion 334 includes an indicator window 335. A lens 336 is included in the indicator window 335.

The top wall includes a perimeter edge 337. A cylindrical side wall 338 is appended to the perimeter edge 337 and extends downward toward the housing 314. Retaining lugs 340 are appended to the interior of the cylindrical side wall 338. Retaining lugs 340 couple the housing 314, the annular torque transmission ring 318, the drive hub 316, and the shell 312 together.

A closure member or housing 314 is provided that is configured to threadingly engage a threaded filler neck in a conventional manner to provide a fluid-tight seal when the housing 314 is fully engaged into the filler neck. It will be understood that any suitable alternative mechanism can also be used.

A pressure-vacuum valve assembly 342 is shown for illustrative purposes only in its conventional position disposed in the housing 314. The pressure-vacuum valve assembly 342 controls the venting of fuel vapor from the fuel tank when the pressure within the tank reaches a predetermined superatmospheric level. The pressure-vacuum valve assembly 342 also controls the venting of air into the fuel tank when the pressure in the tank decreases to a predetermined subatmospheric level. The pressure-vacuum valve assembly 342 is a conventional unit and well known by those skilled in the art. It will be understood that any suitable valve could be used.

In addition, it will be understood that the novel features of the present invention are unrelated to the function of the pressure-vacuum valve assembly 342. Therefore, the inclusion of the assembly 342 is shown for illustrative purposes only. The cap 310 of the present invention will function regardless of the inclusion or omission of a pressure-vacuum valve assembly similar to the assembly 342.

The housing 314 includes a radially outwardly extending flange 344 at an axially upper portion of the housing 314. Six peripherally and slightly axially upwardly extending resilient fingers 346 are attached to the flange 344. Each of the resilient fingers 346 terminates in a pawl tooth 348.

Figures 10, 11, 12:
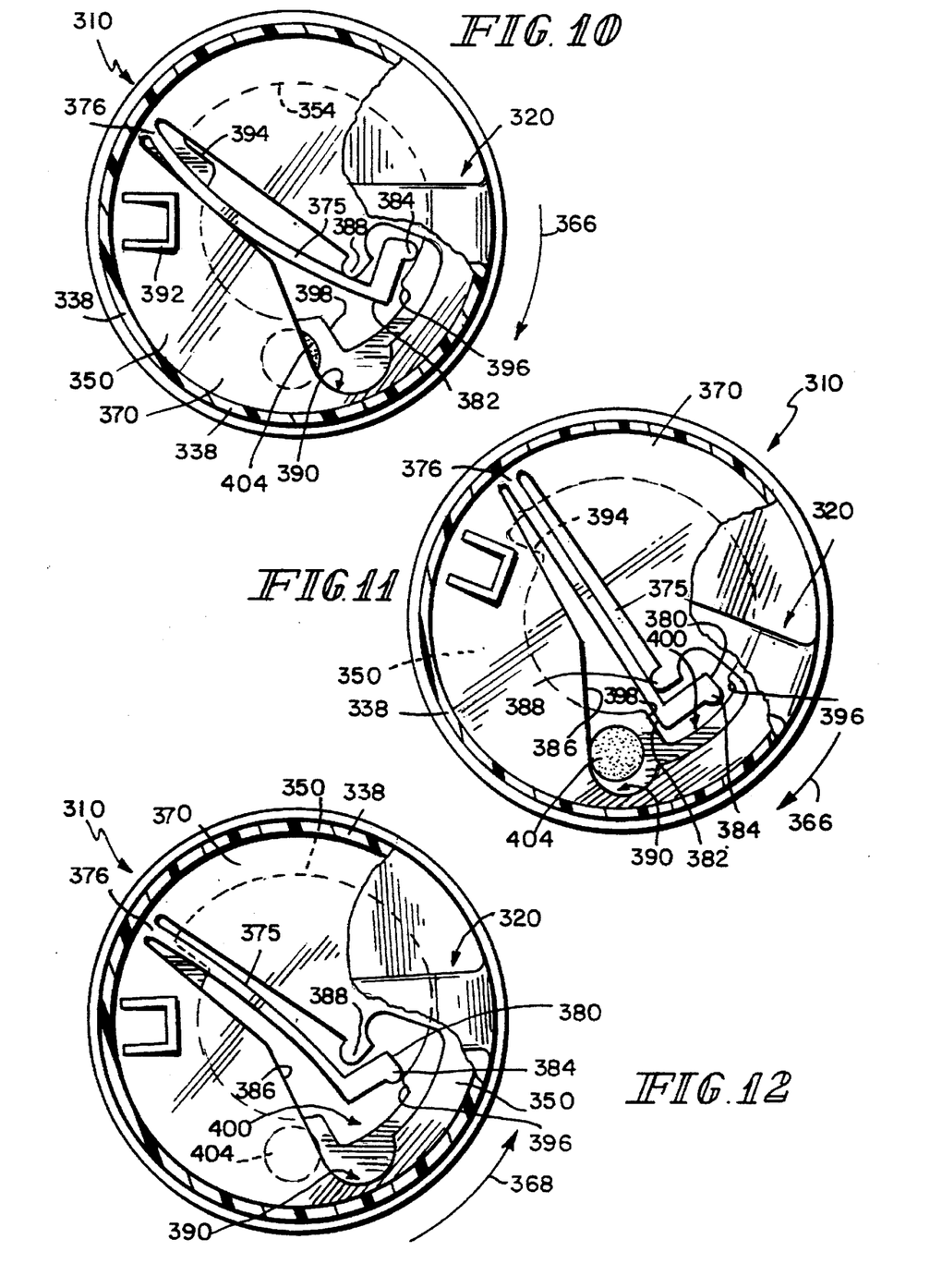
FIG. 10 is a top plan view of the fuel cap in FIG. 9, with portions broken away, showing the relative positions of the annular ring and the handle in the cap-advancing orientation.
FIG. 11 is a view similar to FIG. 10, showing the relative positions of the annular ring and the handle in the fully closed position with the L-shaped arm retained in the anti-drift pocket and the indicator dot exposed, signalling to a user that the cap is properly installed in a sealed filler neck-closing position.
FIG. 12 is a view similar to FIGS. 10 and 11, showing the relative positions of the annular ring and the handle as the handle is advanced in the cap-removal direction and the L-shaped arm is released by the anti-drift pocket.

The annular torque transmission ring 318 includes an annular top wall 350, an annular bottom wall 352, a cylindrical inner edge 354, and a cylindrical outer edge 356. The annular torque transmission ring 318 is situated between the drive hub 316 and the housing 314 and is bounded by the cylindrical side wall 338 of the shell 312, as shown in FIG. 10. The annular top wall 350 faces the drive hub 316. The annular bottom wall 352 includes pockets 358 that are formed between spaced-apart teeth 360, as shown in FIG. 9. Each tooth includes an angled face 362 and an upright face 364. The annular bottom wall 352 cooperates with the resilient fingers 346. Specifically, the angled faces 362 of the spaced-apart teeth 360 engage the pawl teeth 348 to provide a torque overriding connection of the annular torque transmission ring 318 to the housing in a cap-advancing direction 366 to permit advancement of the housing 314 into the filler neck. The torque overriding connection prevents overtightening the housing 314 in the filler neck.

In addition, the upright faces 364 of the spaced-apart teeth 360 engage the pawl teeth 348. This engagement provides a direct connection of the annular torque transmission ring 318 to the housing 314 in a cap-removal direction 368 to permit removal of the housing 314 from the filler neck.

A drive hub 316 is situated between the shell 312 and the annular torque transmission ring 318, as shown in FIG. 9, to permit establishment of a driving connection between the shell 312 and the annular torque transmission ring 318. The drive hub 316 includes a drive hub top wall 370 which includes a drive hub perimeter edge 372, and a resilient L-shaped arm 374. The L-shaped arm 374 includes a proximal end 376 mounted to the drive hub top wall 370 and a distal end 378. The distal end 378 of the L-shaped arm 374 itself is somewhat L-shaped and includes a cap-removal drive lug 380, a cap-advancing drive lug 382, and a variable torque lug head 384. The drive hub top wall 370 is cut out around the L-shaped arm 374 to form an irregular aperture around L-shaped arm 374 and provide a cap-removal support lug 386 and an intermediate support lug 388. The drive hub top wall 370 also includes an indicator cutout 390.

In addition, the drive hub top wall 370 includes two drive couplings 392 that extend inward from the drive hub perimeter edge 372 and upward toward the shell 312 to provide shell-engagement means. Each one of the drive couplings 392 is configured to engage the corresponding upstanding side walls 326, 328 of the shell 312. The drive couplings 392 act to impart direct rotational movement of the shell 312 to the drive hub 316 in response to rotation of the shell 312.

The cylindrical outer edge 356 of the annular torque transmission ring 318 lies adjacent to the cylindrical side wall 338 of the shell 312. The cylindrical inner edge 354 is concentric to the cylindrical outer edge 356. The cylindrical inner edge 354 includes a second driven face 394, an anti-drift face 396, and a first driven face 398. The distance of the cylindrical inner edge 354 from the cylindrical outer edge 356 is a maximum between the first driven face 398 and the second driven face 394. Proceeding clockwise along the cylindrical inner edge 354, the distance of the cylindrical inner edge 354 from the cylindrical outer edge 356 is a minimum adjacent to the second driven face 394, increasing gradually toward the anti-drift face 396, returning to its minimum between the anti-drift face 396 and the first driven face 398. The anti-drift face 396 and the first driven face 398 are arranged in a spaced-apart relationship forming an anti-drift pocket 400 sized to accept the distal end of the L-shaped arm 378.

The cap-removal drive lug 380, the cap-advancing drive lug 382, and the variable torque lug head 384 extend downward from the drive hub 316 into a region 402 bounded by the cylindrical inner edge 354 and engage the driven faces 394, 398 to transmit rotation from the shell 312 to the annular torque transmission ring 318. The drive lugs 380, 382 and the driven faces 394, 398 also cooperate to provide a delayed actuation driving connection. In the illustrated embodiment, the drive lugs 380, 382 are spaced apart approximately 10° and the driven faces 394, 398 are spaced apart approximately 190° to provide approximately 180° of lost motion that the drive hub 316 must travel through once the cap-advancing drive lug 382 disengages the first driven face 398 in a cap-advancing direction 366 (clockwise in FIG. 11) and before the cap-removal drive lug 380 engages the second driven face 394 in a cap-removal direction 368 (counterclockwise in FIG. 13). Thus, the spacings between the cap-advancing drive lug 382 and the cap-removal drive lug 380, and the first driven face 398 and the second driven face 394 provide a predetermined lost-motion dimension between the drive hub 316 and the annular torque transmission ring 318, and consequently between the drive hub 316 and the housing 314. Because the shell 312 is rigidly connected to the drive hub 316, these spacings provide the same predetermined amount of lost motion between the shell 312 and the housing 314. In alternative embodiments, the drive lugs 380, 382 and the driven faces 394, 398 may be spaced apart at any predetermined angular dimension to provide a desired lost-motion distance.

The distal end of the L-shaped arm 378 is sized and configured to be releasably received by the anti-drift pocket 400 formed in the cylindrical inner edge 354 of the annular torque transmission ring 318. The anti-drift face 396, the first driven face 398, and the distal end of the L-shaped arm 378 are arranged such that when the shell 312 is rotated in a cap-advancing direction 366 and the cap-advancing drive lug 382 engages the first driven face 398, the distal end of the L-shaped arm 378 will rest in the anti-drift pocket 400. The variable torque lug head 384 and the anti-drift face 396 cooperate when the drive hub 316 is in this position to prevent any drifting rotational movement of the drive hub 316 with respect to the annular torque transmission ring 318. This feature will be discussed below in the description relating to FIGS. 10–13.

An indicator dot 404 is affixed to the annular top wall 350. The indicator dot 404 is located so that when the cap 310 is in its closed position, shown in FIG. 11, and the distal end of the L-shaped arm 378 is contained in the anti-drift pocket 400, the indicator dot 404 is visible through the lens 336, the indicator window 335, and the indicator cutout 390, providing a visual indication that the cap 310 is in its sealed filler neck-closing position.

Figure 13:
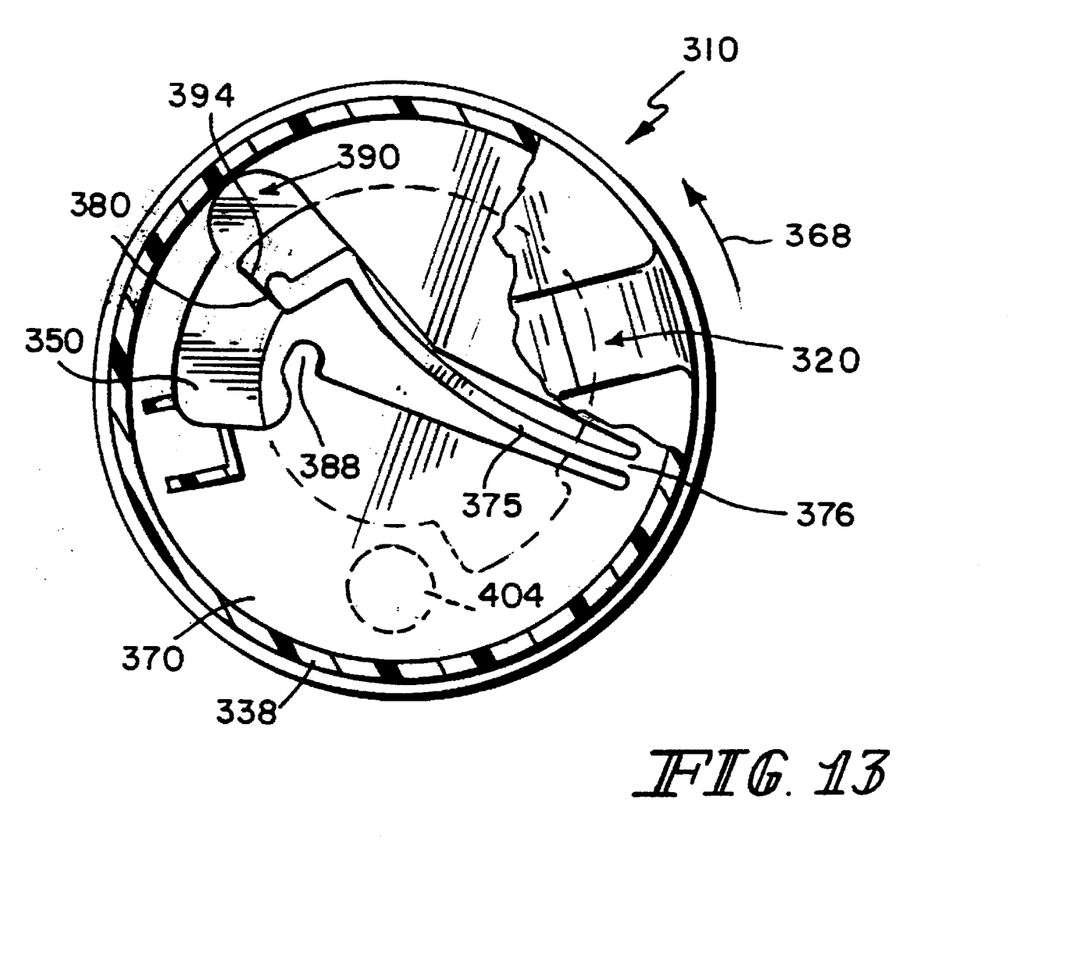
FIG. 13 is a view similar to FIGS. 10–12, showing the relative positions of the annular ring and the handle with the L-shaped arm engaging a driven face on the annular ring in the cap-removal orientation.

The operation of the annular torque transmission ring 318 to impart rotational movement to the housing 314 in response to rotation of drive hub 316 is illustrated in FIGS. 10–13. As noted above, drive hub 316 is keyed to rotate with shell 312 due to engagement of drive couplings 392 on drive hub 316 and upstanding side walls 326, 328 on shell 312. The orientation of drive hub 316 of a fuel cap 310 that is properly installed in the filler neck of a fuel tank is illustrated in FIG. 11, while a cap-removal orientation of drive hub 316 is illustrated in FIG. 13 to demonstrate the "lost motion" capability of delayed actuation fuel cap 310. Specifically, FIGS. 11 and 13 show the relationship between the cap-removal drive lug 380 and the second driven face 394 and the cap-advancing drive lug 382 and the first driven face 398 to provide the predetermined amount of lost motion between the shell 312 and the closure 314.

When the drive hub 316 is in the position shown in FIG. 13, the cap-removal drive lug 380 is abutting the second driven face 394. In this orientation, the drive hub 316 is positioned to impart direct rotational movement to the annular torque transmission ring 318, and consequently to the housing 314, in the cap-removal direction 368 to remove the cap 310 from the filler neck.

Assuming that the cap 310 is removed from the filler neck and the operator (not shown) desires to insert the cap 310 into the filler neck, the shell 312 is rotated in the cap-advancing direction 366 which rotates the drive hub 316. The variable torque lug head 384 and the cylindrical inner edge 354 of the annular torque transmission ring 318 cooperate to provide a variable torque resistance resulting in a noticeable difference in the applied torque required to continue rotation of the shell 312 in a cap-advancing direction 366 after the housing 314 achieves a fluid-tight seal with the filler neck.

Once the cap 310 is inserted into the filler neck and the operator begins rotating the handle 312 in the cap-advancing direction 366, the variable torque lug head 384 advances along the cylindrical inner edge 354 from the second driven face 394 toward the first driven face 398 as shown in FIG. 10. The radius of the cylindrical inner edge 354 decreases when advancing from the second driven face 394 to the first driven face 398 in the cap-advancing direction 366, increasing the stress applied to the L-shaped arm 374 as the variable torque lug head 384 advances along the cylindrical inner edge 354. The increasing stress on the L-shaped arm 374 results in an increasing resistance to rotation of the drive hub 316 which will be noticeable to the operator. The increasing stress on the L-shaped arm 374 also results in an increase of friction between the variable torque lug head 384 and the cylindrical inner edge 354. As the variable torque lug head 384 approaches the anti-drift face 396, the force required to continue advancing the drive hub 316 in the cap-advancing direction 366 relative to the annular torque transmission ring 318 will exceed the force required to rotate the housing 314 in the filler neck.

Once this orientation is attained, shown in FIG. 10, further rotational movement of the drive hub 316 in the cap-advancing direction imparts direct rotational movement to the annular torque transmission ring 318, and consequently to the housing 314. This rotational movement acts to engage the housing 314 in the filler neck. The direct rotational movement of the drive hub 316, the annular torque transmission ring 318, and the housing 314 in the cap-advancing direction is continued until the housing 314 is fully engaged in the filler neck.

Further rotation of the shell 314 in the cap-advancing direction 366 results in the advancement of the variable torque lug head 384 in direction 366 past the anti-drift face 396 as shown in FIG. 11. When the variable torque lug head 384 advances past the anti-drift face 396, the distal end of the L-shaped arm 378 will advance to the anti-drift pocket 400 and the indicator dot 404 will be visible through the indicator cutout 390, the indicator window 335, and the lens 336, providing a visual indication that the cap 310 is closed as shown in FIG. 11. Still further rotation of the shell 312 and drive hub 316 in the cap-advancing direction results in the annular torque transmission ring 318 rotating with respect to the closure 314 due to the torque overriding connection between the annular torque transmission ring 318 and the housing 314, as described previously, to prevent overtightening of the housing 314.

Because the distal end of the L-shaped arm 378 is resiliently received within the anti-drift pocket 400, the shell 312 and drive hub 316 are prevented from any drifting rotational movement in the cap-removal direction 368. This is advantageous because any drifting rotational movement of the drive hub 316 in the cap-removal direction 368 would reduce the predetermined amount of lost-motion movement available between the drive hub 316 and the annular torque transmission ring 318. Thus, because the distal end of the L-shaped arm 378 is resiliently received within the anti-drift pocket 400, the maximum amount of predetermined lost motion in the cap-removal direction 368 is maintained when the cap 310 is properly installed in the filler neck.

To remove the cap 310 from the filler neck, the operator begins rotating the shell 312 in the cap-removal direction 368. Initial rotation of the shell 312 and drive hub 316 in the cap-removal direction 368 forces the distal end of the L-shaped arm 378 out of the anti-drift pocket 400 without imparting any rotational movement to the annular torque transmission ring 318 or housing 314, as shown in FIG. 12. Continued rotational movement of the drive hub 316 in the cap-removal direction 368 moves the cap-removal drive lug 380 toward the second driven face 394. The drive hub 316 is rotated for approximately 180° before the cap-removal drive lug 380 abuts the second driven face 394. Thus, in the illustrated embodiment, the predetermined amount of lost motion between the drive hub 316 and the annular torque transmission ring 318 in the cap-removal direction 368 is approximately 180°. Once the cap-removal drive lug 380 abuts the second driven face 394, as shown in FIG. 13, continued rotation of the drive hub 316 in the cap-removal direction 368 will impart direct rotational movement to the housing 314 to begin removing the housing 314 from the filler neck.

By providing the approximately 180° of lost motion between rotation of the shell 312 with respect to the housing 314 in the cap-removal direction 368, the crashworthiness of the cap 310 is improved. When the cap 310 is properly installed in the filler neck, the drive hub 316 will be in the position illustrated by FIG. 11. Should the vehicle (not shown) be involved in an accident which results in a portion of the vehicle body interacting with the shell 312 to impart rotational movement on the shell 312 in the cap-removal direction 368, the shell 312 would have to rotate a full 180° before the housing 314 begins to disengage from the filler neck. Thus, unless the shell 312 is rotated a full 180°, the housing 314 remains in full sealing contact with the filler neck.

Although the invention has been described in detail with reference to a preferred embodiment, variations and modifications exist within the scope and spirit of the invention as described and defined in the following claims.

I claim:

1. A cap for use in the filler hock of a tank, the cap comprising
   a closure for closing the filler neck,
   a handle configured to rotate the closure relative to the filler neck to a sealed position engaging the filler neck and establishing a sealed connection between the closure and the filler neck, the handle including a shell having a top wall and a handle grip formed on the top wall for rotating the handle the handle grip being oriented to bisect the top wall to form a first and a second semi-circular portion, the first semicircular portion being formed to include a window, and
   a delayed actuator for providing a lost-motion driving connection between the handle and the closure, and
   a visual indicator providing a visible indication of sealed closure of the filler neck in the window formed in the first semi-circular portion upon movement of the closure in the filler neck to its sealed position.

2. The cap of claim 1, wherein the visual indicator is affixed to the delayed actuator.

3. The cap of claim 2, wherein the indicator includes tactile means for producing a tactile change of applied torque required to rotate the handle upon movement of the closure in the filler neck to its sealed position.

4. The cap of claim 1, further comprising second indicator means for providing an indication of sealed closure of the filler neck upon movement of the closure in the filler neck to its sealed position, the second indicator means including an annular ring disposed between the handle and the closure, a cylindrical inner edge of the annular ring, a cylindrical outer edge of the annular ring, an annular top wall of the annular ring, a member coupled to the handle, and rotation resistance means for retaining the member during rotation of the handle about its axis of rotation and releasing the member upon movement of the closure in the filler neck to its sealed position.

5. The cap of claim 4, wherein the member is a resilient member with a proximal end appended to a drive hub disposed between the handle and the annular ring and a distal end extending radially toward the cylindrical outer edge of the annular ring and the rotation resistance means includes the cylindrical inner edge arranged to engage the distal end of the resilient member.

6. The cap of claim 4, wherein the member is a latch arm with a proximal end appended to a drive hub disposed between the handle and the annular ring and a distal end extending circumferentially and terminating in a latch lug, and the rotation resistance means includes a driven lug appended to the annular top wall.

7. The cap of claim 4, wherein the member is a drive pin integrally appended to the handle and the rotation resistance means includes a driven lug with a proximal end appended to the cylindrical inner edge and a distal end extending radially toward the axis of rotation, a second driven member with a proximal end appended to the driven lug distal end, and a distal end extending circumferentially and terminating in a retaining lug.

8. The cap of claim 1, further comprising second indicator means for providing an indication or sealed closure of the filler neck upon movement of the closure in the filler neck to its sealed position, the second indicator means including tactile means for producing a tactile change of applied torque required to rotate the handle upon movement of the closure in the filler neck to its sealed position, the tactile means including a resilient member coupled to the handle, tensioning means for tensioning the resilient member before movement of the closure in the filler neck to its sealed position, and means for releasing the resilient member upon movement of the closure in the filler neck to its sealed position.

9. The cap of claim 8 wherein the tensioning means includes a cylindrical inner edge of an annular ring disposed between the handle and the closure.

10. The cap of claim 9, wherein the resilient member is an L-shaped arm including a proximal end affixed to a drive hub disposed between the handle and the annular ring and a distal end that engages the cylindrical inner edge of one annular ring.

11. The cap of claim 1, wherein the delayed actuator includes an annular ring disposed between the shell and the closure the annular ring has a cylindrical inner edge and a driven lug appended to the cylindrical inner edge, and the indicator is affixed to the driven lug.

12. The cap of claim 11, wherein the indicator faces toward the shell.

13. The cap of claim 1, wherein the delayed actuator includes a drive hub coupled to the handle, and further comprising second indicator means for providing an indication of sealed closure of the filler neck upon movement of the closure in the filler neck to its sealed position, the second indicator means including tactile means for producing a tactile change of applied torque required to rotate the handle upon movement of the closure in the filler neck to its sealed position, the tactile memos including an indicator affixed to the drive hub.

14. The cap of claim 13, wherein the indicator is a resilient arm.

15. The cap of claim 14, wherein the delayed actuator further includes an annular ring disposed between the drive hub and the housing, the annular ring including an am-tensioning lug, the arm-tensioning lug releasing the resilient arm upon movement of the closure in the filler neck to its sealed position to provide a tactile indication to a user.

16. The cap of claim 14, wherein the delayed actuator further includes an annular ring disposed between the drive hub and the housing, the annular ring including a driven face, and further comprising striking means for audibly striking the driven face with the resilient member upon movement of the closure in the filler neck to its sealed position.

17. The cap of claim 1, further comprising an audible indicator to produce an audible indication of sealed closure of the filler neck, the audible indicator including a resilient member coupled to the handle, a driven face coupled to the closure, and striking means for striking the driven face with the resilient member upon movement of the closure in the filler neck to its sealed position.

18. The cap of claim 17, wherein the striking means includes tensioning means for tensioning the resilient member before movement of the closure in the filler neck to its sealed position and holding means for holding the resilient member during movement of the closure in the filler neck, the holding means releasing the resilient member upon movement of the closure in the filler neck to its sealed position.

19. The cap of claim 18, wherein the resilient member is an L-shaped arm including a proximal end affixed to the delayed actuator and a distal end that engages the tensioning means, the holding means, and the driven face.

20. A cap for use in the filler neck of a tank, the cap comprising a closure for closing the filler neck, a handle for rotating the closure relative to the filler neck to a sealed position engaging the filler neck and establishing a sealed connection between the closure end the filler neck, a delayed actuator providing a lost-motion driving connection between the handle and the closure, and indicator means or providing an indication of sealed closure of the filler neck upon movement of the closure in the filler neck to its sealed position, wherein the indicator means includes an indicator affixed to the delayed actuator and the indicator is a reflective member visible to a user of the fuel cap.

21. The cap of claim 20, wherein the indicator means further includes a window formed in the handle to expose the indicator so that the indicator is visible to a user upon movement of the closure in the filler neck to its sealed position.

22. The cap of claim 21, wherein the handle includes a circular top wall and the window is formed in the circular top wall.

23. The cap of claim 21, wherein the delayed actuator including an annular ring with a cylindrical inner edge and a driven lug appended to the cylindrical inner edge and the indicator is affixed to the driven lug and is arranged to face toward the handle.

24. The cap of claim 20, further comprising second indicator means for providing an indication of sealed closure of the filler neck upon movement of the closure in the filler neck to its sealed position, the second indicator means including an annular ring disposed between the handle and the closure, a cylindrical inner edge of the annular ring, a driven lug appended to the cylindrical inner edge, a resilient member coupled to the handle, and striking means for striking the driven lug with the resilient member upon movement of the closure in the filler neck to its sealed position.

25. The cap of claim 24, wherein the striking means includes the cylindrical inner edge of the annular ring which is arranged to engage the resilient member during rotation of the handle about its axis of rotation and to release the resilient member upon movement of the closure in the filler neck to its sealed position.

26. The cap of claim 20, wherein the indicator means includes means for producing an audible sound upon movement of the closure in the filler neck to its sealed position.

27. The cap of claim 20, wherein the top wall of the shell is formed to include a window for exposing the reflective member so that the reflective member is visible to a user upon movement of the closure in the filler neck to its sealed position.

28. The cap or claim 27, wherein handle includes a circular top wall and the window is formed in the top wall.

29. The cap of claim 27, wherein the delayed actuator further includes a drive hub disposed between the shell and the annular ring, the drive hub including an indicator cutout for exposing the indicator.

30. A cap for use in the filler neck of a tank, the cap comprising a closure for closing the filler neck, a handle for rotating the closure relative to the filler neck to a sealed position engaging the filler neck and establishing a sealed connection between the closure and the filler neck, the handle including a circular top wall, the circular top wall including an indicator window, a delayed actuator providing a lost-motion driving connection between the handle and the closure, a reflective member affixed to the delayed actuator, and alignment means for preventing alignment of the reflective member with the indicator window when rotating the closure relative to the filler neck until the closure is in its sealed position in the filler neck.

31. The cap of claim 30, wherein the delayed actuator includes an annular ring disposed between the handle and the closure, with an annular top wall, a cylindrical inner edge and a driven lug, the driven lug includes a proximal end appended to the cylindrical inner edge and a distal end extending radially toward the axis of rotation, and the reflective member is affixed to the driven lug and is arranged to face toward the handle.

32. The cap of claim 31, wherein the alignment means includes a second member with a proximal end appended to the distal end of the driven lug and a distal end that includes a retaining lug.

33. The cap of claim 32, wherein the alignment means further includes a drive pin integrally appended to the handle and arranged to engage the retaining lug during rotation of the handle about its axis of rotation and the retaining lug is arranged to release the drive pin upon movement of the closure in the filler neck to its sealed position.

34. The cap of claim 31, wherein the delayed actuator includes a drive hub disposed between the handle and the annular ring, and the drive hub includes an indicator cutout and a cylindrical outer edge.

35. The cap of claim 34, wherein the alignment means includes a latch arm that includes a proximal end appended to the drive hub and a distal end extending circumferentially and terminating in a latch lug.

36. The cap of claim 35, wherein the alignment means further includes a driven lug appended to the annular top wall arranged to engage the latch lug during rotation of the handle about its axis of rotation and to release the latch lug upon movement of the closure in the filler neck to its sealed position.

37. The cap of claim 34, wherein the alignment means includes a resilient member with a proximal end appended to the drive hub and a distal end extending radially toward the drive hub cylindrical outer edge.

38. The cap of claim 37, wherein the alignment means further includes the cylindrical inner edge of the annular ring arranged to engage the distal end of the resilient member during rotation of the handle about its axis of rotation and to release the resilient member upon movement of the closure in the filler neck to its sealed position.

39. A fuel cap for closing the threaded filler neck of a fuel tank, the cap comprising a housing having threads for engaging the filler neck, a seal for sealingly engaging the filler neck upon rotation of the housing in a first direction, the seal being coupled to the housing, a shell including a top wall formed to include a window and a handle for rotating the housing relative to the filler neck, the handle being formed on the top wall, a hub providing a lost-motion driving connection between the shell and the housing, the lost motion of the hub acting to permit a predetermined amount or relative movement of the shell relative to the filler neck before rotating the housing relative to the filler neck sufficiently to break the sealing engagement provided by the seal, and indicator means for visually indicating that the seal sealingly engaged the filler neck upon rotation of the housing in the filler neck to its sealed position, the indicator means including a an indicator affixed to the hub and positioned to lie in the window in a position visible to an observer upon rotation of the housing in the filler neck to its sealed position.

40. A fuel cap for closing the threaded filler neck of a fuel tank, the cap comprising a housing having threads for engaging the filler neck, a seal for sealingly engaging the filler neck upon rotation of the housing in a first direction, a handle for rotating the housing relative to the filler neck, a hub providing a lost-motion driving connection between the handle and a housing, the lost motion of the hub acting to permit a predetermined amount of relative movement of the handle relative to the filler neck before rotating the housing relative to the filler neck sufficiently to break the sealing engagement provided by the seal, and indicator means for indicating that the seal sealingly engaged the filler neck upon rotation of the housing in the filler neck to its sealed position, wherein the indicator means includes an indicator affixed to the hub and the indicator is a reflective member visible to a user of the fuel cap.

41. The cap of claim 40 further comprising audible means for producing an audible sound upon rotation of the housing in the filler neck to its sealed position, the audible means being affixed to the hub.

42. The cap of claim 40, further comprising tactile means for producing a tactile change of applied torque required to rotate the handle upon rotation of the housing in the filler neck to its sealed petition, the tactile means being affixed to the hub.

43. A cap for use in the filler neck of a tank, the filler neck having an annular lip defining a mouth, the cap comprising a gasket, means blocking the filler neck for urging the gasket against the annular lip to establish a seal blocking outward flow of fluid and vapor in the filler neck through the filler neck mouth, means for applying a driving force to move the urging means relative to the annular lip of the filler neck from a gasket-tightening position establishing the seal to a gasket-releasing position breaking the seal, and the urging means and the applying means cooperating to provide means for permitting relative movement between the urging means and the applying means to delay establishment of a driving connection between the applying means and the urging means during movement of the applying means in a cap-removal direction, and means for indicating that the seal between the gasket and the annular lip is established upon urging the gasket to its sealed position, the indicating means including an indicator affixed to the applying means and the indicator in a reflective member visible to a user of the fuel cap.

44. The cap of claim 43 further comprising audible means fur producing an audible sound upon urging the gasket to its sealed position, the audible means being affixed to the applying means.

45. The cap of claim 43, further comprising tactile means for producing a tactile change of applied torque required to rotate the handle means upon urging the gasket to its sealed position, the tactile means being affixed to the applying means.

* * * * *